United States Patent Office 3,769,233
Patented Oct. 30, 1973

---

3,769,233
PROCESS FOR THE PREPARATION OF A ZIEGLER-NATTA TYPE CATALYST
Jean Pierre Hermans, Strombeek-Bever, and Paul Henrioulle, Marilles, Belgium, assignors to Solvay & Cie, Brussels, Belgium
No Drawing. Filed Mar. 24, 1971, Ser. No. 127,829
Claims priority, application France, Mar. 26, 1970, 7011085; June 29, 1970, 7024087; July 30, 1970, 7028300; Aug. 3, 1970, 7028663
Int. Cl. B01j *11/84;* C08f *3/10*
U.S. Cl. 252—429 A                     16 Claims

ABSTRACT OF THE DISCLOSURE

A catalyst, useful for the polymerization of olefins, which contains violet $TiCl_3$ and has a high stereospecificity is prepared by contacting brown $TiCl_3$ with $TiCl_4$ at a temperature below 100° C.

---

BACKGROUND OF THE INVENTION

The present invention relates to a process for the preparation of a catalyst and to the method of polymerizing α-olefins by means of the thus obtained catalyst, particularly the method of preparing isotactic polypropylene.

It is well known that titanium trichloride which is used as a catalyst for the polymerization of α-olefins exists in several crystalline forms. Bock and Moser indicate in Monatschefte fur Chemie, 34 (1913), pp. 1825–1843, that by vacuum heating (annealing) at 150 to 200° C., brown $TiCl_3$ is changed into a violet crystalline species.

Several patents concern the use of the violet form of $TiCl_3$ obtained by heating brown $TiCl_3$ at a high temperature, for the polymerization of α-olefins, particularly of propylene, in order to obtain isotactic polypropylene, for example, U.S. Pat. No. 2,951,045, granted to Gamble et al. The violet form of the catalyst is particularly stereospecific for the polymerization of α-olefins, especially for propylene.

As disclosed in French Pat. No. 1,302,808, granted to Montecatini, it is also well known to prepare an olefin polymerization catalyst by reacting with an excess of $TiCl_4$ a mineral support which has been impregnated with an organometallic compound, wherein the support is a compound which is soluble either in water or in a solvent used to wash the polymer and then heating this product at a temperature higher than 150° C.

In Belgian Pat. No. 616,930, granted to Hoechst, a process is described for the preparation of a catalyst which comprises mixing at least a stoichiometric amount of $TiCl_4$ with organoaluminum compounds, in the absence of a dispersing medium, at a temperature between −30 and 70° C., and heating the reaction mixture thus obtained at a temperature of 100 to 150° C., advantageously at the boiling point of $TiCl_4$ (136° C.). According to the examples of this disclosure, the transformation of the brown form of $TiCl_3$ to the violet form takes place at the boiling point of $TiCl_4$.

These temperatures are the temperatures at which the transformation of the brown crystalline species of $TiCl_3$ to the violet crystalline species takes place in the absence of $TiCl_4$ (U.S. Pat. No. 3,032,511).

SUMMARY OF THE INVENTION

Surprisingly, it has been found that a catalyst consisting of violet $TiCl_3$ is obtained from brown $TiCl_3$ produced by the reduction of $TiCl_4$ at a temperature below about 100° C., by contacting brown $TiCl_3$ with $TiCl_4$.

According to the invention, a Ziegler-Natta type catalyst which is highly stereospecific is prepared by contacting $TiCl_3$, which is not stereospecific with $TiCl_4$ at a temperature below 100° C.

The polymorphic transformation can occur even at room temperature when brown $TiCl_3$ is kept in contact with $TiCl_4$.

DESCRIPTION OF THE INVENTION

The $TiCl_4$, in the presence of which brown $TiCl_3$ is transformed into stereospecific violet $TiCl_3$ at a temperature below 100° C., according to the invention, may be liquid $TiCl_4$, optionally diluted by an inert diluent, such as a hydrocarbon or gaseous $TiCl_4$ optionally diluted by inert gases. The $TiCl_4$ may be added to brown $TiCl_3$ after the latter has been washed. The $TiCl_4$ may also originate from $TiCl_4$ used for the preparation of $TiCl_3$ when an excess of $TiCl_4$ has been present in the reaction medium or it may be produced during the polymorphic transformation by oxidation of part of brown $TiCl_3$, for example, by means of gaseous chlorine.

The brown $TiCl_3$ to be transformed may be obtained by any known method, particularly by reduction of $TiCl_4$ with an organometallic compound.

It must be understood that the catalyst obtained which is called "brown $TiCl_3$" is generally a cocrystallized compound of type $3TiCl_3 \cdot AlCl_3$; it is well known that the reduction of $TiCl_4$ by an alkylaluminum or by metallic aluminum results in compounds of this type.

A process which is technologically advantageous involves impregnating a support with an organometallic compound and then introducing the thus impregnated support, at room temperature, to an excess of liquid $TiCl_4$, optionally diluted with an inert diluent. The brown supported $TiCl_3$ which forms may be separated from the liquid $TiCl_4$ by filtration, then optionally washed with hexane and dried and finally resuspended in fresh liquid, optionally diluted $TiCl_4$, in order to effect the polymorphic transformation of brown $TiCl_3$ to the violet form by simple contact with $TiCl_4$ at a temperature below 100° C.

In a particularly advantageous method according to the invention, supported brown $TiCl_3$ may be converted directly in liquid $TiCl_4$ which is used in excess as the reaction medium; the reaction medium, which contains suspended $TiCl_3$ and optionally, a diluent is maintained at a temperature below about 100° C. However, in this procedure the concentration of $TiCl_4$ should be such that an excess of $TiCl_4$ remains after the reduction reaction. When a mixture of $TiCl_4$ and an inert solvent is used to convert brown $TiCl_3$ to the violet form, the concentration of $TiCl_4$ should be at least about 5 vol. per volume of solution.

Preferably, the liquid, optionally diluted $TiCl_4$, in which the transformation takes place is heated to a temperature of about 25 to 100° C. The period of time required for the transformation to take place is a function principally of the temperature, but is also dependent on the dilution of the $TiCl_4$ and may vary from a few minutes to several hours in the temperature range of 25° to 100° C. Periods of transformation which are too long are of course undesirable from an industrial point of view. In general, the maximum period of treatment is about 100 hours. The time of treatment is preferably chosen between 5 and 45 minutes and preferably between 15 and 30 minutes for temperatures between 40 and 80° C., preferably 60° C. when undiluted liquid $TiCl_4$ is used. For treatments at room temperature, 20 to 25° C., a contact time of about 24 hours with undiluted liquid $TiCl_4$ is necessary. In a general way, the contact time which is necessary for the polymorphic transformation with diluted $TiCl_4$ decreases when the temperature increases, whereas the contact time increases with the dilution of $TiCl_4$.

It has been observed that the activity of the catalyst obtained and the characteristics of polypropylene produced in the presence thereof are better when the temperature of the reduction reaction is regulated so that the $TiCl_3$ formed is initially brown and the brown $TiCl_3$ is transformed to the violet form after the reduction reaction takes place with or without separation of the reaction medium from the brown $TiCl_3$.

When the production of polymers having particular physical properties, namely high isotacticities and rigidity moduli, is not of principal importance, the reduction may be carried out by impregnating a support with an organometallic reducing agent and then introducing the thus impregnated support with an excess of $TiCl_4$, which may be diluted or undiluted, at such a temperature that the reduction of $TiCl_4$ and the transformation of brown $TiCl_3$ to a violet form occur simultaneously. Thus, a supported violet catalyst which may be readily separated from the reaction medium by filtration and washing is obtained directly.

As stated above, a preferred embodiment according to the invention involves introducing the support which is impregnated with the reducing agent in liquid $TiCl_4$, in diluted or undiluted form, transforming the brown $TiCl_3$ into violet $TiCl_3$ in the same liquid $TiCl_4$ medium at a temperature below the usual transformation temperatures. This is particularly an important technological advantage of the invention. Owing to the presence of a support, it is indeed possible to control the reduction reaction and to carry out this reaction starting from undiluted $TiCl_4$ and $AlEt_3$ at room temperature.

However, the reduction reaction may also be carried out in the absence of a support, but the highly exothermal reaction is then very violet and it is necessary to operate at low temperature or in a highly diluted medium using, for example, an inert hydrocarbon as diluent. Operating at room temperature in the presence of a support or at low temperature in the absence of such a support, the reduction reaction may be carried out in pure, i.e. undiluted $TiCl_4$ as the reaction medium. The liquid $TiCl_4$ in excess in which the reduction reaction has been carried out may then be used as a medium for the transformation of brown to violet $TiCl_3$ and surprisingly the temperature at which this transformation is effected may be reduced considerably owing to the presence of $TiCl_4$.

From a technological point of view, the possibility of using diluted $TiCl_4$ is also important, particularly when a non-supported catalyst is desired. As a matter of fact, such a catalyst which is prepared from $TiCl_4$ and a reducing agent such as an organometallic compound, is obtained at room temperature by carrying out the reducing reaction in an inert solvent capable of dissipating the heat of the highly exothermal reaction. Providing that there is an excess of $TiCl_4$ in the inert organic medium in which the $TiCl_3$ has been formed, the polymorphous transformation of brown $TiCl_3$ to violet $TiCl_3$ may be carried out by simple prolonged contact at a suitable temperature of brown $TiCl_3$ with the solution which has been used for its formation and which contains $TiCl_4$ in excess. Owing to the dilution of $TiCl_4$, the washing operations, which are necessary after the polymorphous transformation to eliminate the excess of $TiCl_4$, are also less numerous.

Among the diluents of $TiCl_4$, the inert aliphatic hydrocarbons comprising from 5 to 10 carbon atoms which form a liquid mixture with $TiCl_4$ under the conditions of polymorphous transformation may be mentioned. Likewise, hydrocarbons which are gaseous under normal conditions of temperature and pressure, but which dissolve in the liquid $TiCl_4$, may be used. Aromatic hydrocarbons, such as benzene, toluene and xylene are suitable as well.

The polymorphous transformation by means of diluted $TiCl_4$ is preferably carried out at a temperature ranging from 40 to 80° C., preferably from 50 to 70° C. At these temperatures, depending on the catalyst type, the polymorphic transformation time varies from about ½ hour to several hours, and in certain cases the time may be 12 hours. When a solution of $TiCl_4$ containing about 10–30% by volume of $TiCl_4$ is used, for example, at a temperature of about 50–70° C., the transformation takes place in about ¾ hour to 10 hours.

The use of gaseous $TiCl_4$ also has decided technological advantages which stem from the fact that brown $TiCl_3$ may be transformed readily to violet $TiCl_3$ without manipulation of liquids, thus without subsequent washing and without requiring the use of annealing equipment at high temperature. Indeed, the brown $TiCl_3$ which has been washed and dried is simply contacted with gaseous $TiCl_4$ at a moderate temperature.

The circulation of gaseous $TiCl_4$ through pulverulent $TiCl_3$ may be carried out either by fluidizing the latter with gaseous $TiCl_4$ which has been optionally diluted with an inert gas such as nitrogen, or by circulating gaseous $TiCl_4$ which has been optionally diluted with an inert gas in an agitated bed of pulverulent $TiCl_3$.

In general, the vapor pressure of $TiCl_4$ under atmospheric pressure and at temperatures below 100° C. is sufficient to transform brown $TiCl_3$ to violet $TiCl_3$.

The transformation is generally carried out at a temperature ranging from 50 to 100° C., preferably 70 to 95° C. At these temperatures, depending on the type of catalyst, the time of transformation varies from one hour to several days. In general, the contact with gaseous $TiCl_4$ is maintained between one hour and 48 hours.

The preference is generally given to "supported $TiCl_3$" rather than to "non-supported $TiCl_3$" owing to the fact that polymerization in the presence of catalysts composed of supported $TiCl_3$ yields polymers which are characterized by better morphology and higher bulk densities.

When brown $TiCl_3$ supported on a suitable support is heated in an inert hydrocarbon in the absence of $TiCl_4$ at a temperature of 60° C., no modification of the color of the catalyst is observed. Thus, it has been discovered that $TiCl_4$ specifically enables the transformation of brown $TiCl_3$ to violet $TiCl_3$ to take place at a temperature below 100° C.

Polymerization tests of propylene by means of $AlEt_2Cl$ and a catalyst of brown $TiCl_3$ heated, e.g. at 60° C. in the absence of $TiCl_4$ whereby no visible modification of the color of the catalyst occurs. have shown that such a catalyst has very poor activity and the polymers formed thereby are characterized by low crystallinity and a lack of advantageous properties, particularly in comparison to the properties of polymers obtained by means of $AlEt_2Cl$ and violet $TiCl_3$.

The transformation of the supported catalyst according to the invention to a violet form is thus a good test to determine whether the catalyst which has been treated according to the process of the invention has desirable properties with respect to the polymerization of α-olefins.

The supports used for the preparation of the preferred form of the present invention must be inert or made inert toward the reactants used for the preparation of the catalysts and for the polymerization. Thus, they must not possess active groups, such as hydroxyl groups which are capable of reacting either with transition metal halides or with organic derivatives of aluminum, or, when they possess such active groups, the latter must be present in a sufficiently low quantity, with respect to those of the other reactants used, that they do not consume a significant amount of the reactants. Organic as well as inorganic supports may be used.

Particularly interesting inorganic supports for the preparation of stereospecific catalysts include: alumina and particularly α-alumina or corundum, silica, aluminum silicates, namely the catalyst supports called silica-alumina and kaolin, magnesium silicates, magnesia, titanium oxide, calcium carbonate, etc.

A particularly interesting application of the process of the invention involves transforming brown $TiCl_3$, supported on an organic polymer which is inert toward the reactants used during the preparation of the catalyst and during the subsequent activation of brown TiCl₃ to violet TiCl₃ by contact with TiCl₄ at a temperature below 100° C. In this case also, the TiCl₄ used for the transformation of brown TiCl₃ to violet TiCl₃ may be liquid TiCl₄ undiluted or diluted with an inert diluent or gaseous TiCl₄ optionally diluted with inert gases. It may also be produced during the transformation by oxidation of brown TiCl₃, for example, by means of gaseous Cl₂. The preparation of brown TiCl₃ may be carried out by any method useful wherein the catalyst is supported on an organic polymer.

The transformation of brown TiCl₃ to violet TiCl₃ at temperatures below 100° C. is particularly useful for catalysts supported on a polymer, since polymeric supports are generally not stable for long periods at temperatures above 100° C.

The process described, e.g. in Belgian Pat. No. 616,930, which comprises mixing an at least stoichiometric quantity of TiCl₄ with organoaluminum compounds, in the absence of a dispersion medium at −30 to 70° C. and heating the reaction mixture thus obtained to a temperature of 100 to 150° C., preferably at the boiling point of TiCl₄ (136° C.) would not be applicable to TiCl₃ supported on polyethylene or polypropylene, for example, as these polymers swell and degrade at a temperature above 100° C. in the presence of TiCl₄.

Violet TiCl₃ supported on an inert polymer constitutes a catalytic system component which is particularly desirable for the polymerization of α-olefins, particularly of propylene, owing to the fact that after calcination, it leaves few ashes, in comparison with a catalyst supported on a mineral support. It is known, indeed, that the ash residue constitutes an important criterion when evaluating polymers. Furthermore, the use of a supported catalyst confers to the catalyst a morphology which allows it to be carried and transported readily; thus, a supported catalyst is easier to use and in addition, the resultant polymer, particularly a polypropylene, has a desirable morphology, excellent free flowing characteristics and a high bulk density.

The presence of a support, moreover, allows the preparation of brown TiCl₃ by a process of reducing TiCl₄ wherein at least one of the reactants, i.e., TiCl₄ or the reducing agent, an alkyl aluminum derivative optionally chlorinated, is dispersed in the support. By means of this procedure, the reaction may be moderated and controlled without resort to solvents and low temperatures. The presence of the support also facilitates the operations of filtering and washing.

In a particularly desirable procedure, the reduction of TiCl₄ is carried out with an organometallic compound at a temperature below 0° C. in the presence of a solid support. The quantities of solid support, TiCl₄ and organometallic compound are chosen so that the reaction mixture remains pulverulent during the entire reaction.

A method for the preparation of TiCl₃ which has substantial technological advantages is disclosed in French patent application No. 6943826 of Dec. 17, 1969 in the name of Solvay et Cie and copending U.S. application Ser. No. 99,720 of Hermans et al. This process involves impregnating a support with such an organometallic compound and introducing it at room temperature to an excess of liquid TiCl₄ optionally diluted with an inert hydrocarbon such as hexane. The supported brown TiCl₃ which forms may be separated from the liquid TiCl₄ by filtering, then optionally washed with hexane, dried and finally suspended again in fresh TiCl₄ in order to undergo transformation to the violet form by simple contact with TiCl₄ at a temperature below 100° C.

Before use, the supports must be dried very carefully, either by heating at a temperature of 100 to 400° C. for a sufficient time, or for the supports which are not able to undergo this treatment without degradation (polymers, for example), under vacuum at a lower temperature.

Furthermore, it has been observed that a particular type of inorganic support called a "cenosphere," which comprises a porous support in the form of a sphere having an average diameter in the range of 50 to 250 microns and is constituted by small agglomerated elementary particles the diameter of which is in the range of 0.2 to 2 microns, constitutes a support having particularly important advantages in the process according ot the invention.

This type of support is easy to use in the preparation of the catalyst and especially the cenospheres constituted by α-alumina are particularly favorable for obtaining a catalyst having a good morphology and hence, a polymer having also a good morphology.

It must be pointed out also that the use of the supported catalysts obtained by the process according to the invention permits an absolute control of the morphology of the polymer, as described by British Pat. No. 1,162,079 and copending U.S. application Ser. No. 756,330, filed Aug. 29, 1968, and now U.S. Pat. No. 3,594,330 a parallelsim is observed between the morphology of the suppoit and that of the polymer. Thus, by an appropriate choice of the support, polymers having excellent morphologies are obtained easily without regard to conditions of preparation of the catalyst itself.

The cenosphere type support may be obtained inter alia by the pulverization (atomization) process, as described in French Pat. No. 1,548,907. The specific surfaces which are disclosed in this patent are generally too high, however, and may be reduced by a more thorough calcination.

Among the polymeric supports, the halogenated polymers are generally not suitable for the process according to the invention as they tend to react with TiCl₄ or with the optionally halogenated alkylaluminum compounds used for the reduction of TiCl₄ and for the activation of violet TiCl₃.

Particularly interesting supports for the preparation of stereospecific catalysts which may be used for the polymerization of α-olefins, especially of propylene, are the polymers of α-olefins themselves, i.e. high and low density polyethylenes, polypropylene and poly(4-methylpentene-1). These polymers may be impregnated with an alkylaluminum and TiCl₄ in order to form brown TiCl₃ and then the transformation of brown to violet TiCl₃ in the presence of TiCl₄ at a temperature below 100° C. may be carried out without undergoing modifications which bring about notable effects on the catalyst obtained.

The chemical inertness of the support is determined by impregnating the support with TiCl₄ at 65° C. and by washing it with dry hexane. The chemical inertness is deemed satisfactory when the support retains in the region of 1 g. of Ti per kg. of support or less.

TiCl₄ used in the process according to the invention is a pure product obtained by distillation.

As indicated above, an organometallic compound is preferably used as the reducing agent. The organic compounds of a metal of Groups I to III of the Periodic Table of Elements and in particular the organometallic compounds derived from aluminum are particularly advantageous. Among these are found trialkylaluminums, dialkylaluminum halides, alkylaluminum sesquihalides, monoalkylaluminum dihalides, alkylaluminum hydrides, as well as the complex organometallic compounds containing two metals, one of which is aluminum and the compounds obtained by substituting, in the derivatives above, the alkyl groups by cycloalkyl, acyl, arylalkyl or alkylaryl groups.

As to the choice of the organometallic compound used for the reduction, it has been observed that the stereospecificity of the catalysts prepared by means of dialkylaluminum halides and trialkylaluminums increases during heat treatment, but that the catalytic activity decreases for the first compound and increases for the second compound. Preference is generally given to compounds of the second type. However, in general, any organometallic compounds known in the art to reduce TiCl₄ into brown TiCl₃, i.e. organometallic compounds which are sufficiently active to reduce TiCl₄ at low temperatures may be used in the present process.

A preferred method for preparing the catalyst consists in impregnating the organometallic derivative in a support and introducing it in TiCl₄ which may be undiluted or dissolved in an inert solvent such as hexane. This method allows the preparation of the catalyst in large quantities and thus can be readily extrapolated to an industrial scale.

If the supported organometallic compound is introduced to undiluted TiCl₄, it is not necessary to react the two components in well determined proportions and moreover, owing to the "encapsulation" of the reactant in the support, i.e. to its presence within the support itself, and not only at its surface, the reaction occurs evenly without having to carefully control the temperature of the medium. Owing to the high specific heat of TiCl₄, the reaction may be carried out at room temperature or above. The reaction may be carried out from about −35° C. (solidification temperature of TiCl₄) to about 100° C. and preferably between 0 and 50° C. The use of TiCl₄ in excess avoids overreduction to TiCl₂ which has little catalytic activity. Moreover, as mentioned, polymorphic transformation may be carried out immediately at a temperature below 100° C. in the presence of excess TiCl₄.

The violet, stereospecific catalyst obtained is used for the polymerization of olefins according to classical methods. Generally, it must be activated by an organometallic compound of a metal of Groups I to III of the Periodic Table. One of the derivatives of aluminum which has been mentioned as a reducing agent of TiCl₄ may be used for the activation. It is possible to use the same compound both for the reduction and the activation, or to use different compounds. Diethylaluminum chloride is a particularly effective activator, as it assures maximum activity and stereospecificty of the catalyst.

The polymerization of α-olefins may be carried out according to any known method:

in the gaseous phase, i.e. in the absence of any liquid medium;
in an inert solvent, preferably a hydrocarbon solvent;
in the monomer itself, kept in the liquid state under its saturated vapor pressure.

The process according to the present invention applies broadly speaking to the polymerization of all the α-olefins and more particularly of ethylene, propylene, butene-1, pentene-1, methylbutene-1, hexene-1, 3 and 4-methylpentene-1, long chain α-olefins and styrene. It is particularly interesting for the polymerization of propylene, butene-1 and 4-methylpentene-1 to crystalline, highly isotactic polymers.

Owing to the high catalytic activity and stereospecificity of the catalysts and particularly of the supported catalysts used, the process according to the present invention allows the simplification and often even the elimination of the step of removing the amorphous fraction of polymer due to its presence in a very low quantity.

The nature of the phenomenon whereby the temperature of polymorphic transformation of brown TiCl₃ to violet TiCl₃ is reduced has not been precisely determined. Comparative tests have shown that catalysts obtained by the reduction of TiCl₄ by means of trialkylaluminum, which, as is it well known, leads to brown TiCl₃ and AlCl₃, behave differently with regard to the temperature of transformation to a violet form, depending on whether or not the conditions of the invention are respected. The scope of the invention, accordingly, is not limited to a particular crystalline form which may be formed during the treatment according to the invention. X-ray studies of the violet catalyst obtained according to the invenion, however, seem to indicate that it is made of γ or δ TiCl₃.

The invention will be described in more detail in the following examples among which comparisons are made between catalysts prepared according to the process of the invention and according to conventional methods. The examples of the invention illustrate the best mode currently contemplated for carrying out the invention, but must not be construed as limiting the invention in any manner.

In a first series of examples (1 to 30) processes are described for the polymorphous transformation in the presence of pure liquid TiCl₄, in comparison with heat treatments carried out in the absence of TiCl₄.

EXAMPLES 1 to 19

Catalysts are formed on different supports. The catalysts are treated according to the process of the invention to obtain violet TiCl₃. Moreover, comparison tests are made showing that it is not possible to obtain a violet catalyst in the absence of TiCl₄ when operating below 100° C.

In all the examples, the reaction of formation of TiCl₃ by reduction of TiCl₄ occurs in an excess of pure TiCl₄.

The particular conditions for the preparation of the catalyst and the properties of the catalyst obtained are indicated in Table I.

(1) Impregnation of support

Into a glass reactor the inner walls of which are provided with Vigreux tips and which is mounted on a device capable of rotating it, the quantity of support mentioned in Table I is introduced under nitrogen atmosphere, this support having been previously dried for 24 hours at 300° C. under a current of dry nitrogen. As the reactor is rotated, AlEt₃ is added dropwise in such quantity that the support remains pulverulent. AlEt₃ is distributed homogeneously in the support by rotating the reactor for 1 h.

(2) Reduction of TiCl₄

In a cylindrical reactor provided at the bottom with a sintered glass plate, the other reactant is introduced under dry nitrogen atmosphere in the quantities mentioned.

The impregnated support described in (1) is poured in the reactor at the initial temperature indicated and under the conditions mentioned while thermostating the medium.

(3) Heat treatment

Heat treatments have been carried out according to the different conditions indicated in Table I.

In Examples 1 to 4, the product of the reduction reaction (2) is separated from TiCl₄, in which it has been prepared, by filtering the suspension through the sintered glass plate with which the reactor is provided. Then it is washed in the same reactor for one or more times with fresh TiCl₄ and finally it is again suspended in fresh TiCl₄ according to the conditions of temperature and time described, in order to effect the polymorphous transformation.

In Examples 5 to 12, the suspension of brown TiCl₃ in TiCl₄ is also filtered to separate the brown TiCl₃ from the TiCl₄ of the reaction, washed with dry hexane and dried at about 30° C. under reduced pressure to eliminate residual hexane. The brown TiCl₃ is then suspended again in freshly distilled TiCl₄.

In Examples 13 to 17, the reduction reaction mixture of TiCl₄ and suspended brown TiCl₃ is heated with separation of TiCl₃ and TiCl₄.

Examples 18 and 19 illustrate the transformation of brown to violet TiCl₃ at room temperature by prolonged contact with an excess of TiCl₄; in Example 18, fresh TiCl₄ is used and in Example 19, the same TiCl₄ from which (and in which) the brown TiCl₃ has been formed by the reduction of TiCl₄ is used.

(4) Properties of resultant catalyst

The color of the catalyst obtained has been indicated and an X-ray analysis has been made, in order to determine the crystalline structure of $TiCl_3$.

(5) Polymerization of propylene (a) 1.5 liter autoclave: Into a 1.5 liter autoclave which has been dried and flushed with a flow of gaseous propylene, there are introduced:

200 mg. of $Al(C_2H_5)_2Cl$;
the quantity of $TiCl_3$ indicated in Table I
hydrogen under a partial pressure of 1 kg. a./cm.$^2$
1 liter of liquid propylene.

The temperature of the reaction medium is raised to 60° C. and the reaction mixture is stirred during the time indicated.

The results of the polymerization which were carried out with different catalysts prepared in accordance with the process described in (a) are also set forth in Table I.

(b) 5 liter autoclave: The same procedure is repeated but in the 5 liter autoclave there are introduced:

600 mg. of $Al(C_2H_5)_2Cl$
the quantity of $TiCl_3$ indicated in Table I
hydrogen under a partial pressure of 0.7 kg. a./cm.$^2$
3 liters of liquid propylene.

The activity and the productivity of the catalyst used has been calculated and on the other hand, the properties of the polymer formed have been measured. The results are also given in Table I.

EXAMPLES 20 TO 28

(1) Preparation of catalyst

In a 500 ml. flask provided with Vigreux tips, mounted on an axial rotating device and provided with two axial pipes for the introduction of the reactants, are introduced under an inert atmosphere:

(a) The quantity specified in Table II of a perfectly dried inert support;

(b) then dropwise into the support while stirring, owing to the rotation of the flask, the quantity of $AlEt_3$ specified, the stirring being maintained until the $AlEt_3$ has been distributed homogeneously in the support; this operation is carried out at room temperature;

(c) The flask is externally cooled at —20° C. by means of a methanol-solid carbon dioxide mixture and, while rotating the flask, the specified quantity of $TiCl_4$ is introduced in the flask; as the volumes of the reactants used ($AlEt_3+TiCl_4$) are not larger than the porous volume of the support, the latter keeps its pulverulent character before and after reaction;

(d) Without interrupting the rotation of the flask, the temperature is raised to 10° C. in 1 h., then to room temperature also in 1 h.

The brown colored product obtained contains about 200 mg. of $TiCl_3$ per g. of catalyst.

(2) Heat treatment

As for Examples 1 to 19, several heat treatments have been carried out according to the conditions specified in Table II.

(3) Properties of the resultant catalyst

The results are given in Table II.

(4) Polymerization of propylene

Polymerization was carried out according to procedure (a) or (b) as indicated for Examples 1 to 18, the specific conditions and the results are set forth in Table II.

The different supports used in Examples 1 to 28, which are commercial products, are described below:

$\alpha Al_2O_3$: corundum produced by Carborundum under the trademark SAEHS 33–50

$TiO_2$: rutile $TiO_2$ has been used and prepared in the following manner:

A homogeneous paste is formed using a minimum quantity of water. The paste is kept in a ventilated oven (about 100° C.) until apparently dry (1 to 2 h.). The easily friable blocks obtained are introduced into a muffle brought at 950° C. where they stay for about 1 h. 30. Cooling occurs in the air. The tough blocks obtained are milled in a mortar and classified to hold back the particles having from 88 to 250μ (yield about 50%). This support has a cenospheroidal structure.

Calcic fluoroapatite

In a mortar there are mixed 50.232 g. (0.2 mole) of calcic hydroxylapatite $[Ca(PO_4)_2]_3Ca(OH)_2$ and 3.904 g. of $CaF_2$ (0.2 mole). The mixture is kept in a muffle at 800° C. for 24 h., cooled at 400° C. in the muffle and then the product is introduced in a dessicator.

The product is washed twice with ammonium chloride (2 N) at 80° C. and rinsed with water until the absence of chlorides in the washing water is observed. The paste obtained is introduced in a ventilated oven at 100° C. until apparently dry, then in a muffle at 900° C. (1 hour).

The product obtained is milled and classified, whereby particles of 88 to 250μ are held back.

Being alkaline, the product obtained is treated with 0.1 N HCl and then rinsed with water for several times.

Finally the product is dried in a ventilated oven at 100° C., then in a fluidized bed reactor at 350° C. under nitrogen for 24 hours.

A support is obtained having a cenospheroidal structure (porous volume 0.35 ml./g.).

$SiO_2$: Silica produced by Avisun is dried in a muffle for 15 h. at 700° C. and then placed in dry nitrogen atmosphere. The porous volume is 1.4 ml./g., 1.9 ml. of $AlEt_3$ per g. is added, so that it remains pulverulent. Then, the $AlEt_3$ impregnated silica is extracted with hexane by a Soxhlet. Finally, the silica is dried with dry hexane.

EXAMPLES 29 AND 30

(1) Preparation of the catalyst 250 ml. of pure and dry hexane and 20 ml. of rectified $TiCl_4$ are introduced under $N_2$ atmosphere in a 500 ml. three-necked flask, provided with a metallic agitator.

This flask is dipped in a refrigerating bath maintained at a temperature of —40° C. To the solution of $TiCl_4$, in hexane 10 ml. of pure $AlEt_3$ are added so as to realize a $TiCl_4/AlEt_3$ molar ratio equal to 3. The addition is carried out in 5 minutes and under vigorous agitation.

After the addition, the flask is withdrawn from the bath and left under agitation for 30 min. at room temperature. Then the flask is dipped in a thermostat at room temperature which is raised to 65° C. in 10 min. After agitation for 1 hour at this temperature, the flask is withdrawn from the thermostat and is cooled to room temperature still under agitation.

The flask then contains a suspension of $TiCl_3$ in hexane. This suspension is decanted under $N_2$ atmosphere in a filter provided with a sintered plate, in order to separate $TiCl_3$ from hexane; the $TiCl_3$ is washed 4 times with 100 ml. of dry hexane and resuspended after each washing.

$TiCl_3$ is dried under reduced pressure in the filter provided with the sintered plate. For the run above, 36 g. of $TiCl_3$ are recovered as a brown pyrophoric powder.

(2) Heat treatment

Carried out as indicated in Table II.

(3) Properties of catalyst

These properties are also given in Table II.

(4) Polymerization of propylene

Carried out as for Examples 1 to 28. The results are given in Table II.

EXAMPLE 31

(1) Preparation of catalyst

One hundred ml. of TiCl$_4$ are introduced in a reactor (diameter 65 mm., height 200 mm.), the bottom of which is constituted by a sintered glass plate, provided with a glass helix and with inlet tubes for the reactants. TiCl$_4$ is cooled at −30° C. and a solution of 10 ml. of AlEt$_3$ in 20 ml. of dry hexane are added dropwise in 15 minutes.

After the addition, the temperature of the reactor is allowed to rise naturally and reaches 50° C. in about 60 min.

The excess TiCl$_4$ is removed by filtering through the sintered plate and rinsed 8 times with 100 ml. of hexane. It is dried under reduced pressure. A brown pyrophoric powder is obtained.

(2) Heat treatment

Ten g. of this product are suspended in 50 ml. of TiCl$_4$. The suspension is brought to 40° C. for 150 min. Then, the product is separated from TiCl$_4$ by filtration, washed with dry hexane and finally dried.

(3) Properties of the catalyst

Set forth in Table II.

(4) Polymerization of propylene

The polymerization is carried out as in the preceding examples. The results are given in Table II.

Examples 1 to 4 relate to a process in which the supported brown catalyst, obtained by reaction in pure liquid TiCl$_4$, is separated from TiCl$_4$ in which it has been formed, then rinsed one or more times with fresh and undiluted liquid TiCl$_4$ and finally resuspended in fresh TiCl$_4$ in order to carry out the polymorphous transformation.

Examples 5 to 12, as well as 18, all relate to a process in which the catalyst, obtained during the reduction, is separated, rinsed and dried before being heat treated.

Heat treatment of Examples 1 to 4 and 9, 11, 12, for a catalyst supported on αAl$_2$O$_3$ and of Example 10 for a catalyst supported on rutile TiO$_2$, gives a violet catalyst; polymerization of propylene in the presence of this catalyst yields a polypropylene having good properties.

Treatments carried out under conditions which are similar to those of the process of the invention with regard to temperature and time, but in the absence of TiCl$_4$ (Examples 6 and 7) do not result in a violet catalyst. To obtain the violet form, in the absence of TiCl$_4$, the classical treatment at 200° C. in dry state or in hexane must be resorted to.

Examples 13 to 17 relates to a process in which the catalyst resulting from the reduction has not been separated, the polymorphous transformation being carried out, except for the comparative examples, in TiCl$_4$ which has been used as the reaction medium for the reduction.

Examples 13 to 16 (support, αAl$_2$O$_3$) and 17 (support, SiO$_2$) illustrate the production of violet TiCl$_3$ by the process of the invention.

From Examples 18 and 19, it may be concluded that TiCl$_3$ in contact with TiCl$_4$, i.e., TiCl$_3$ which has been either separated, rinsed and dried and resuspended in fresh TiCl$_4$, or not separated from TiCl$_4$ which has been used as a reaction medium, becomes violet at room temperature.

As mentioned, all the catalysts of Examples 1 to 19 have been prepared in an excess of TiCl$_4$.

In Examples 20 to 30, on the other hand, the catalysts have been prepared by reduction of TiCl$_4$ at low temperature by an approximately stoichiometric quantity of a reducing agent (AlEt$_3$).

In Example 31, the catalyst has been prepared in the absence of a support by reduction at low temperature, by means of a large excess of TiCl$_4$.

Examples 20, 21 and 22 have been carried out according to the invention (supported catalysts) and Examples 23 to 28 illustrate by way of comparison the classical polymorphous transformation processes.

Examples 29 to 30 provide a comparison of a non-supported catalyst treated according to the invention (30 and 31) with a non-supported catalyst treated according to the classical method (29).

TABLE I

| Example No. | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1. Impregnation of support: | | | | | | | | | | | | | | | | | | | |
| Nature of support | ← | | αAl$_2$O$_3$ | | | | | | → | TiO$_2$ | ← | | | αAl$_2$O$_3$ | | → | SiO$_2$ | αAl$_2$O$_3$ | |
| Impregnated support used (g.) | ← | 1,500 | | → | ← | | 48 | | → | 29 | 50.5 | 1,500 | | 50 | 48.5 | 50 | 13 | 1,500 | 47 |
| AlEt$_3$ contents of support (ml./g.) | ← | | 0.1 | | | | | | → | 0.116 | 0.11 | ← | | 0.1 | → | 0.11 | 0.33 | 0.1 | 0.1 |
| 2. Reduction reaction: | | | | | | | | | | | | | | | | | | | |
| Pure TiCl$_4$ used (ml.) | ← | | 3,000 | | | → | ← | 100 | → | | 3,000 | 3,000 | ← | | 100 | → | 97.5 | 3,000 | 100 |
| Initial temperature (° C.) | ← | | 20 | | | → | ← | 25 | → | 20 | 20 | 13 | 20 | 20 | 20 | 20 | 0 | 20 | 20 |
| Time of introduction of solid (min.) | ← | | 60 | | | → | ← | 5 | → | 44 | 30 | 38 | 60 | 60 | 43 | 58 | 36 | 30 | 60 | 52 |
| Time of reaction after introduction (min.) | ← | | 60 | | | → | | | 105 | 30 | 94 | 60 | 60 | 50 | 15 | 150 | 25 | 60 | 72 |
| Reaction temp. (° C.) | ← | | 20 | | | → | | | 25 | 25 | 20 | 15 | 30 | 30 | 30 | 20 | 30 | 20 | 25 |
| Rinsing | | | | | Yes | ← | | | → | | | | → | ← | | No | → | Yes | No |
| Nature of rinsing solvent | ← | TiCl$_4$ | → | ← | | | Hexane | | | | | | → | | | | | (¹) | |
| Drying | ← | | No | → | ← | | | Yes | | | | | → | | | | | Yes | |
| 3. Heat treatment: | | | | | | | | | | | | | | | | | | | |
| Medium | ← | | TiCl$_4$ | → | | | Hexane | | ← | | | | | TiCl$_4$ | | | | | → |
| Time (min.) | 30 | 15 | 30 | 15 | 6 | 30 | 25 | 15 | 150 | 15 | 120 | 15 | 240 | 15 | 39 | 150 | 30 | ² 24 | ² 24 |
| Temperature (° C.) | 60 | 60 | 60 | 60 | 200 | 60 | 60 | 200 | 40 | 100 | 40 | 40 | 60 | 60 | 40 | 40 | 80 | 25 | 25 |
| 4. Properties of catalyst: | | | | | | | | | | | | | | | | | | | |
| TiCl$_3$ contents (g./kg.) | 176 | 177 | 176 | 153 | 163 | 160 | 160 | 196 | 218 | 225 | 215 | 133 | 257 | 234 | 226 | 232 | 448 | 174 | 172 |
| Reduction rate (mole percent) | | | 94 | | | | | 97 | | | | | | | | | 100 | | |
| Colour | ← | | Violet | | → | | Brown | ← | | | | | | Violet | | | → | | |
| X-rays analysis | γδ | γδ | γδ | γδ | β | β | γδ | γδ | | | | | | γδ | | γδ | | γδ | γδ |
| 5. Polymerization: | | | | | | | | | | | | | | | | | | | |
| Polym. condition (a=1.5 liter: b=5 liter) | b | b | b | b | b | | | a | a | a | b | b | b | b | b | b | a | b | b |
| TiCl$_3$ used (mg.) | 182 | 173 | 182 | 157 | 170 | | | 57 | 153 | 63 | 158 | 148 | 208 | 171 | 170 | 164 | 40 | 161 | 175 |
| Molar ratio AlEtCl/TiCl$_3$ | 4.2 | 4.5 | 4.2 | 4.9 | 4.5 | | | 45 | 5 | 4 | 4.9 | 5.2 | 3.7 | 4.5 | 4.1 | 4.7 | 20 | 4.8 | 4.4 |
| Polymer time (h.) | 3 | 3 | 3 | 3 | 3 | | | 5 | 3 | 4 | 3 | 3 | 3 | 3 | 3 | 3 | 3 | 3 | 3.5 |
| Product obtained (g.) g. PP | 480 | 487 | 480 | 457 | 473 | | | 154 | 420 | 135 | 480 | 463 | 424 | 455 | 414 | 386 | 100 | 402 | 436 |
| Activity g. TiCl$_3$×h | 880 | 940 | 880 | 974 | 924 | | | 542 | 915 | 536 | 1,010 | 1,043 | 680 | 887 | 741 | 785 | 630 | 831 | 715 |
| Productivity g. PP/g. sup. cat. | 465 | 498 | 465 | 446 | 452 | | | 532 | 598 | 483 | 653 | 416 | 523 | 624 | 502 | 547 | 280 | 433 | 430 |
| Real density (g./dm.³) | 908 | 907 | 908 | 906 | 908 | | | 906 | 907 | 905 | | | | 906 | 908 | | | 907 | |
| G modulus³ 60° arch at 100° C. | 891 | 835 | 891 | 743 | 883 | | | 825 | 865 | 782 | 794 | 802 | 772 | 788 | 689 | 767 | 843 | 839 | 848 |
| MFI g./10 min. 230° C. under 2.16 kg. | 5.6 | 3.2 | 5.6 | 6.9 | 1.9 | | | 2.3 | 3.4 | 2.7 | 7 | 5.8 | 10.3 | 6.4 | | | 3.5 | 5.5 | 3.2 |

¹ Hexane.
² Hours.
³ G modulus=apparent rigidity modulus under torsion.

TABLE II

| Example No. | 20 | 21 | 22 | 23 | 24 | 25 | 26 | 27 | 28 | 29 | 30 | 31 |
|---|---|---|---|---|---|---|---|---|---|---|---|---|
| 1. Preparation of catalyst: | | | | | | | | | | | | |
| Nature of support | αAl₂O₃ | | TiO₂ | αAl₂O₃ | | TiO₂ | (¹) | αAl₂O₃ | | | | |
| Weight of support used (g.) | 72 | 72 | 37 | 69.5 | 61 | 37 | 15.5 | 72 | 72 | | | |
| AlEt₃ (ml.) | 6.0 | 6.0 | 3.8 | 5.8 | 6.1 | 3.8 | 1.8 | 6.0 | 6.0 | 10 | 10 | 10 |
| TiCl₄ (ml.) | 12.0 | 12.0 | 7.6 | 11.6 | 12.2 | 7.6 | 3.6 | 12.0 | 12.0 | 25 | 25 | 100 |
| 2. Heat treatment: | | | | | | | | | | | | |
| Medium | ← TiCl₄ → | | | | | | | ← Hexane → | | TiCl₄ | | |
| Time (min.) | ← 15 → | | | 180 | 6 | 6 | 180 | 15 | 15 | 6 | 15 | 150 |
| Temperature (° C.) | 80 | 95 | 80 | 140 | 200 | 200 | 200 | 140 | 200 | 200 | 100 | 40 |
| 3. Proportion of catalyst: | | | | | | | | | | | | |
| TiCl₃ contents (g./kg.) | 190 | 190 | 222 | 181 | 203 | 191 | 249 | | 196 | 843 | 856 | 735 |
| Color | ← Violet → | | | | | | | Brown | ← Violet → | | | |
| 4. Polymerization: | | | | | | | | | | | | |
| Polymer conditions (a=1.5 liter; b=5 liter) | b | b | b | a | a | a | a | a | a | a | a | b |
| TiCl₃ used (mg.) | 193 | 157 | 149 | 62 | 56 | 60 | 70 | 48 | 61 | 70 | 58 | 170 |
| Molar ratio AlEt₂Cl/TiCl₃ | 4 | 5.0 | 5.2 | 4.2 | 4.6 | 4.3 | 3.6 | 5.4 | 4.2 | 4.9 | 4.4 | 4.5 |
| Polymer, time (h.) | 3.5 | 4 | 3.5 | 3 | 3 | 3 | 3 | 5 | 3 | 5 | 3 | 3 |
| Product obtained (g.) | 482 | 326 | 257 | 181 | 147 | 187 | 117 | 135 | 165 | 147 | 165 | 407 |
| Activity g. PP / g. TiCl₃×h | 714 | 520 | 492 | 978 | 866 | 1,040 | 417 | 568 | 901 | 566 | 945 | 802 |
| Productivity g. PP/g. supp. catal | 475 | 395 | 382 | 517 | 537 | 596 | 414 | 506 | 614 | 2,100 | 2,430 | 1,760 |
| Real density (g./dm.³) | 907 | 907 | 907 | 907 | 908 | 907 | 908 | 888 | 908 | 905 | 905 | |
| G modulus 60° arch at 100° C | 857 | 821 | 859 | 821 | 913 | 884 | 898 | 442 | 864 | 771 | 737 | 746 |
| MFI g./10 min. 230° C. under 2.16 kg | 3.6 | 5.8 | 8.7 | 8.9 | 2.4 | 2.1 | 2.3 | 6.9 | 3.1 | 3.0 | 0.73 | |

¹ Fluoro apatite.

In a second series of examples (32 to 37), methods are described for the preparation of catalysts, as well as the treatments for the polymorphous transformation in the presence of diluted TiCl₄ according to the invention. Finally, the results of polymerization of propylene by means of the catalysts according to the invention are indicated.

EXAMPLES 32 TO 37

(1) Preparation of brown TiCl₃

(a) Catalyst supported on αAl₂O₃.

First method

A 500 ml. flask, provided with 4 rows of Vigreux tips aligned according to the generants, is mounted on a rotating device provided with inlet tubes for the reactants during the rotation of the flask.

The whole installation is maintained in the dry state and under inert atmosphere. Sixty two g. of αAl₂O₃, which have been previously dried for 24 h. at 300° C. under a N₂ flow, are introduced into the flask.

The total porous volume of these 62 g. of αAl₂O₃ is equal to 15 ml. Five ml. of pure AlEt₃ are added dropwise into the flask which is rotated about 35 r.p.m. at room temperature.

The distribution of AlEt₃ in αAl₂O₃ is made uniform by rotating the flask for 1 to 2 hours.

The flask is externally cooled at −20° C. by means of methanol-solid CO₂ bath during 15 min. Ten ml. recitified TiCl₄ are introduced dropwise into the flask containing alumina which has been impregnated with AlEt₃, still maintained externally at −20° C.

After introduction of TiCl₄, the alumina which has been impregnated with the reaction product of AlEt₃ with TiCl₄ at −20° C., keeps its pulverulent nature.

The temperature of the bath is brought in 1 hour from −20° C. to 10° C.

The support impregnated with brown TiCl₃ is further agitated in the flask for 1 h. at room temperatures.

Second method

A 5 l. flask, provided with 14 Vigreux tips, 1 to 2 cm. deep, aligned according to the generants, is mounted on a rotation device provided with inlet tubes for the reactants during rotation of the flask.

The whole installation is maintained in the dry state and under inert atmosphere.

One kg. of αAl₂O₃ which has been previously dried for 24 h. at 300° C. under a N₂ flow is introduced into a flask.

The total porous volume of 1 kg. of αAl₂O₃ is 280 ml.

A mixture comprising 110 ml. of AlEt₃ and 170 ml. of dry hexane is introduced in 15 min. in a flask which is rotated at about 25 r.p.m. The distribution of the AlEt₃-hexane solution in αAl₂O₃ is made uniform by rotating the flask for 1 to 2 h.

In a cylindrical reactor (height 180 mm., diameter 65 mm.), provided with an agitation device and inlet tubes for the reactants, the bottom of which is constituted by a sintered glass plate followed by an outlet tube, 100 ml. of rectified TiCl₄ are introduced under an atmosphere of pure and dry nitrogen.

This reactor is dipped in a thermostat at a temperature of 25° C. and 85 g. of the impregnated support described above are introduced in about 78 min.

After introduction of the total amount of impregnated support into TiCl₄, the medium is further agitated for 94 min. at 25° C.

The liquid phase is then eliminated through the sintered plate and the supported brown catalyst obtained is further washed with 5× 100 ml. of dry hexane. After these washings, the reactor containing the supported catalyst and 100 ml. of hexane is raised to 65° C. for 1 hour, then the supported catalyst is washed again with hexane as above.

The supported brown catalyst is then dried by an upward flow of pure and dry nitrogen through the sintered plate.

(b) Non-supported catalyst.

Third method

The process is the same as indicated for Examples 29 and 30.

(2) Polymorphous transformation of brown TiCl₃

The catalysts prepared according to the methods described are then submitted to an identical polymorphous transformation treatment described below:

Brown TiCl₃ is an amount of 4 to 5 g., supported or not, is introduced under N₂ atmosphere in a cylindrical reactor (height 120 mm., diameter 40 mm.) provided with inlet tubes for the reactants, the bottom of which is constituted by a sintered glass plate followed by an outlet tube.

Fifty ml. of a TiCl₄-n.hexane mixture, having a TiCl₄ content given in Table III are then poured into the reactor containing brown TiCl₃.

The reactor is then dipped in an oil bath at 65° C. for a period of time indicated in the table. The violet catalyst obtained is separated from the TiCl₄-hexane mixture and washed with 100 ml. of dry hexane 5 times through the sintered glass plate, then dried under reduced pressure at 30° C.

(3) Direct preparation of violet TiCl₃

Fourth method

Two hundred fifty ml. of pure and dry hexane and 40 ml. of rectified TiCl₄ (Al/Ti=0.2) are introduced under $N_2$ atmosphere into a 500 ml. 3-necked flask, provided with a metallic agitator.

The flask is dipped in a refrigerating bath at —20° C.

Ten ml. of $AlEt_3$ are added in 5 min. to the solution of $TiCl_4$ in hexane, maintained under good agitation.

Then the flask is dipped in an oil bath at room temperature, which temperature is raised in 10 min. to 65° C. After agitation for 1 hour at 65° C., the flask is withdrawn from the oil bath and brought back to room temperature, still under agitation.

The flask then contains a suspension of violet $TiCl_3$ in hexane.

This suspension is decanted under $N_2$ atmosphere in a filter provided with a sintered plate in order to separate the violet $TiCl_3$ from the solution.

The violet $TiCl_3$ is washed with 4 times 100 ml. of hexane, then suspended in about 300 ml. of dry hexane.

It is not necessary to separate it from the diluent medium and it may be used by preparing by vigorous agitation, a homogeneous suspension of $TiCl_3$ in hexane and by sampling, with a graduated pipette, a determined volume of the suspension.

Under the conditions described, 1.5 ml. of the suspension correspond to 243 mg. of $TiCl_3$.

(4) Polymerization of propylene

The catalysts obtained have been used for the polymerization of propylene under the following conditions.

In a 5 l. autoclave which has been previously dried and maintained under dry $N_2$ atmosphere, there are introduced, under a flow of gaseous propylene:

600 mg. of $AlEt_2Cl$,
the quantity of $TiCl_3$, supported or not, indicated in Table III,
hydrogen, under a partial pressure of 0.8 kg. a./cm.$^2$,
3 l. of liquid propylene.

The temperature of the reaction medium maintained under agitation is raised to 55° C. and kept there for 3 h. The excess of propylene is then eliminated by expansion and the polypropylene formed is recovered.

The properties of the polypropylene obtained are also given in Table III.

lysts, which are prepared in the brown form by using a stoichiometric ratio of $TiCl_4$ and alkylaluminum (Al/Ti—0.4) so that the total amount of reactants is used, and which are then submitted to a second step of polymorphous transformation. It is observed that, at constant temperature (65° C.) an increase of the concentration of $TiCl_4$ during the polymorphous transformation permits a reduction of the time necessary to effect the transformation.

The activities of the catalyst are high and products with an excellent rigidity modulus may be obtained thereby.

In a third series of examples (38 to 45) the preparation methods of catalyst and the polymorphous transformation treatments are described in the presence of gaseous $TiCl_4$ according to the invention. Finally, the results of propylene polymerization runs with catalysts according to the invention are indicated.

EXAMPLES 38 TO 45

(1) Preparation of brown $TiCl_3$ (a) Catalyst supported on $\alpha Al_2O_3$.

First method

This method is identical to the first method described in Examples 32 to 37.

Second method

This method is identical to the second method described in Examples 32 to 37.

(b) Non-supported catalyst.

Third method

This method is identical to the third method described in Examples 32 to 37.

(2) Polymorphous transformation of brown $TiCl_3$ to violet $TiCl_3$

The reactor used to carry out the transformation of $\beta TiCl_3$ to $\gamma TiCl_3$ by means of $TiCl_4$ vapors comprises a glass cylinder (height 100 mm., diameter 40 mm.) which is separated in two parts by a sintered glass plate.

The volume of the part which is situated above the sin-

TABLE III

| | Example no. | | | | | |
|---|---|---|---|---|---|---|
| | 32 | 33 | 34 | 35 | 36 | 37 |
| Preparation method | 1 | 2 | 3 | 3 | 3 | 4 |
| Polymorphous transformation: | | | | | | |
| Reaction medium | ← | $TiCl_4$ diluted with hexane | → | | | |
| $TiCl_4$ contents of hexane (volume percent) | 20 | 20 | 5 | 10 | 20 | |
| Contact time catalyst diluted $TiCl_4$ (h.) | 4.5 | 1.5 | 9 | 7 | 0.75 | |
| Temperature (° C.) | 65 | 65 | 65 | 65 | 65 | |
| Characteristics of catalyst: | | | | | | |
| Color | ← | | Violet | | → | |
| $TiCl_3$ contents (g./kg.) | 173 | 213 | 745 | 745 | 745 | |
| Polymerization run: | | | | | | |
| $TiCl_3$ used (mg.) | 157 | 185 | 228 | 223 | 98 | 243 |
| Molar ratio $AlEt_2Cl/TiCl_3$ | 4.9 | 4.2 | 3.4 | 3.5 | 7.8 | 3.2 |
| Partial pressure of $H_2$ (kg. absolute/cm.$^2$) | ← | | 0.8 | | → | |
| Polymerization time (h.) | ← | | 3 | | → | |
| Polymerization temperature (° C.) | ← | | 55 | | → | |
| Yield of polypropylene (g.) | 353 | 455 | 534 | 470 | 206 | 566 |
| Activity $\frac{g. \text{ of PP}}{h \times g. TiCl_3}$ | 750 | 820 | 781 | 704 | 703 | 777 |
| Productivity g. of PP/g. of catalyst | 390 | 524 | 1,745 | 1,570 | 1,572 | 1,810 |
| Characteristics of polypropylene: | | | | | | |
| Apparent rigidity modulus under torsion 60° of arch at 100° C. (kg./cm.$^2$) | 833 | 818 | 761 | 742 | 707 | 825 |
| MFI at 230° C. under 2.16 kg. g./10 min | | 8 | 6.6 | 4.7 | 7.1 | |

The analysis of data in Table III indicates that at a concentration of 20 volume percent of $TiCl_4$ in hexane, the polymorphous transformation at 65° C. takes place in a short time.

In the case of supported catalysts (Examples 32 and 33), it appears that the method of preparation of the catalyst does not have an important influence on the catalytic properties or on the properties of the polymer obtained with this catalyst.

Examples 34, 35 and 36 relate to non-supported catatered plate is about 3 times superior to the volume of the part situated below the sintered plate.

The reactor is provided with inlet tubes for the reactants above and below the sintered plate. The bottom of the cylinder is constituted by an outlet tube for the liquid reactants.

All the operations are carried out in dry glassware under nitrogen flow. Four to 5 g. of brown $TiCl_3$, supported or not, are introduced in the part of the reactor situated above the sintered plate.

Liquid $TiCl_4$ is then introduced in the other part of the reactor so as to bring the level of $TiCl_4$ to about 1 cm. below the lower part of the sintered plate.

The reactor is then dipped in an oil bath at temperatures and for times given in Table IV, Examples 38 to 45.

The $TiCl_4$ vapors pass through the sintered glass plate and come into contact with brown $TiCl_3$ to effect the transformation to violet $TiCl_3$.

Examples 38 to 40 and 41 and 42 relate respectively to the supported brown $TiCl_3$ prepared according to the first and the second method.

Examples 43 to 45 relate to non-supported brown $TiCl_3$ (third method).

Residual $TiCl_4$ when present on the violet catalyst is eliminated by nitrogen flow. It may also be eliminated by washing with hexane.

The data relating to each of the runs are given in Table IV below.

(3) Polymerization of propylene

The polymerization of propylene is carried out as indicated above in Examples 32 to 37.

The properties of the polypropylene obtained are also given in Table IV.

TABLE IV

|  | Example No. | | | | | | | |
|---|---|---|---|---|---|---|---|---|
|  | 38 | 39 | 40 | 41 | 42 | 43 | 44 | 45 |
| Preparation method | 1 | 1 | 1 | 2 | 2 | 3 | 3 | 3 |
| Transformation: | | | | | | | | |
| Reaction medium | ← | | gaseous $TiCl_4$ | | | | | → |
| Contact time catalyst gaseous $TiCl_4$ (h.) | 48 | 5.5 | 1 | 80 | 3 | 48 | 2.5 | 1.5 |
| Temperature (° C.) | 24 | 60 | 99 | 24 | 60 | 24 | 60 | 90 |
| Characteristics of catalyst: | | | | | | | | |
| Color | ← | | Violet | | | | | → |
| $TiCl_3$ contents (g./kg.) | 175 | 175 | 178 | 213 | 213 | 745 | 745 | 745 |
| Polymerization run: | | | | | | | | |
| $TiCl_3$ used (mg.) | 156 | 163 | 158 | 160 | 188 | 224 | 205 | 276 |
| Molar ratio $AlEt_2Cl/TiCl_3$ | 5 | 4.7 | 4.9 | 4.8 | 4.1 | 3.5 | 3.8 | 2.8 |
| Partial pressure $H_2$ (kg. absolute/cm.²) | ← | | | 0.8 | | | | → |
| Polymerization temperature (° C.) | ← | | | | 55 | | | → |
| Polymerization time (h) | ← | | | | 3 | | | → |
| Yield of polypropylene (g.) | 264 | 204 | 283 | 261 | 255 | 387 | 251 | 528 |
| Activity $\frac{g.\ of\ PP}{h.\times g.\ of\ TiCl_3}$ | 563 | 419 | 598 | 544 | 451 | 575 | 408 | 640 |
| Productivity g. of PP/g. of catalyst | 296 | 217 | 319 | 348 | 292 | 1,287 | 914 | 1,428 |
| Characteristics of polypropylene: | | | | | | | | |
| Apparent rigidity modulus under torsion at 60° of arch at 100° C. (kg./cm.²) | 756 | 695 | 849 | 918 | 781 | 805 | 792 | 780 |
| MFI at 230° C. under 2.16 kg. (g./10 min) | 4.5 | 9.2 | 6.6 | 5.5 | 4.5 | 4.7 | 8.5 | 3 |

The analysis of the data in Table IV indicates that at low temperature the times necessary for the transformation are relatively long.

In the case of supported catalysts (runs 38 to 40 on the one hand, and 41 and 42 on the other hand, it does not appear that the method of preparation of the catalyst can have an important effect on the catalytic properties and on the properties of the polymer obtained with these catalysts.

Examples 42, 44 and 45 relate to non-supported catalysts which are prepared in the brown form by using a stoichiometric ratio of $TiCl_4$ and alkylaluminum $$(Al/Ti=0.4)$$

so that the total quantity of reactants is used. These catalysts are submitted in a second step to effect the transformation to violet $TiCl_3$.

The activities of the catalysts are high and the products obtained thereby have a good rigidity modulus.

In a fourth series of examples (46 to 66), methods are illustrated for the preparation of catalysts supported on polyolefins, as well as the treatments for the transformation according to the invention.

Finally, the mode of operation is indicated for the polymerization of propylene by means of the catalyst according to the invention. The specific conditions and the results of the different polymerization are given in Table V.

(1) Nature of support

In Examples 46 to 51, a non-treated polypropylene powder (fluff), prepared by means of a commercial catalyst, viz. violet 3 $TiCl_3.AlCl_3$ (Stauffer AA), has been used.

The support (type A) used in Examples 52 to 56, 63 and 64 is a fluff of polyethylene sold under the name Eltex A1050 by Solvay & Cie.

The support (type B) used in Examples 57 to 59 is a fluff of polyethylene sold under the name Eltex 6037 by Solvay & Cie and obtained by a process involving the use of a partially hexavalent chromium oxide catalyst.

The support (type C) of Examples 60 to 62, 65 and 66 is a fluff of polyethylene obtained by means of a Ziegler type catalyst supported on alumina having a high specific surface.

By fluff is meant a polymer powder as it is obtained immediately at the exit of the polymerization line and having undergone no finishing treatment, e.g. granulation.

(2) Drying of support

The support is introduced into a glass flask which is dipped in a bath at 80° C. and subjected to a reduced pressure of 0.1 mm. of Hg for 5 h. The flask is then filled with dry nitrogen under low pressure.

(3) Impregnation of support by $AlEt_3$ or $AlEt_2Cl$

A flask of 5 liters, provided with 14 Vigreux tips, 1 to 2 cm. deep aligned according to the generants, is mounted on a rotating device provided with inlet tubes for the reactants during the rotation of the flask. The whole apparatus is maintained in the dry state and under inert atmosphere (dry $N_2$).

Nine hundred g. of PP or PE support which has been dried are introduced into the flask.

The quantities of $AlEt_3$ or $AlEt_2Cl$ (ml./g.) given in Table V are added dropwise, in 15 min., in a flask which is rotated at about 25 r.p.m. The quantities of liquid introduced are calculated so that the impregnated support keeps its pulverulent character. The distribution of $AlEt_3$ or $AlEt_2Cl$ in the support is made uniform by rotating the flask for 1 to 2 h.

(4) Reaction of support impregnated by $AlEt_3$ or $AlEt_2Cl$ with $TiCl_4$ in excess The quantity of rectified $TiCl_4$ indicated in Table V is introduced under pure and dry nitrogen atmosphere in a cylindrical reactor (height 180 mm., diameter 65 mm.), provided with an agitation device and with inlet tubes for the reactants, the bottom of which is constituted by a sintered glass plate and provided with an outlet tube.

The reactor is dipped into a thermostatic bath at the temperatures indicated in the table and the quantity of supported AlEt₃ (Examples 46 to 64) or supported AlEt₂Cl (Examples 65 and 66) are introduced into the reactor in the times indicated.

After introduction in TiCl₄ of the complete quantity of the impregnated support, the reaction medium is left under agitation at the temperature and for the times indicated.

(5) Transformation of brown TiCl₃ to violet TiCl₃

The catalyst obtained is violet at the end of the preceding treatment under the conditions of Examples 51 and 56 and it suffices to wash it with hexane, either at room temperature (Example 51), or at boiling point (Example 56), then to dry it.

For runs 46, 50, 52, 53, 54, 55, 57, 58, 60, 61, 65 and 66, the transformation of supported brown $TiCl_3$ to supported violet $TiCl_3$ is carried out in the reaction medium, for the times and the temperatures indicated.

The transformation of the supported brown $TiCl_3$ of runs 47, 48, 49 and 62 is carried out in undiluted, pure $TiCl_4$, and not in $TiCl_4$ from the reaction, at the temperatures and for the times indicated: after having successively separated the supported brown $TiCl_3$ from $TiCl_4$ of the reaction and having washed the supported brown $TiCl_3$ with hexane, the material is dried. The transformation in pure $TiCl_4$ is carried out according to Example 59 after simple elimination, by filtration, of the $TiCl_4$ used during the reduction reaction, without washing with hexane. The transformation of the supported brown $TiCl_3$ of runs 63 and 64 is carried out respectively in hexane diluted $TiCl_4$ and in $TiCl_4$ vapor, at the temperatures and for the times indicated in Table V.

The transformation in gaseous $TiCl_4$ medium is carried out in a reactor which is identical to the one used for the preparation of supported brown $TiCl_3$ is put on the sintered plate and liquid $TiCl_4$ is introduced under the plate, so as to bring the surface of the liquid $TiCl_4$ to 1 to 2 cm. below the sintered plate. Then the temperature is brought to the temperature indicated.

(6) Washing and drying after transformation

The catalysts of Examples 46 and 52 to 66 are washed with boiling hexane, the others are washed with hexane at room temperature (runs 47 to 51). These catalysts are then dried by flushing with pure and dry nitrogen.

(7) Polymerization of propylene

The polymerization of propylene is carried out as indicated above in Examples 32 to 37, the partial pressure of hydrogen, however, varying from 0.7 to 0.8 kg./cm.² as indicated in Table V.

TABLE V

| Example number | 46 | 47 | 48 | 49 | 50 | 51 | 52 | 53 | 54 | 55 | 56 |
|---|---|---|---|---|---|---|---|---|---|---|---|
| Impregnation of support: | | | | | | | | | | | |
| Nature of support | | | Fluff PP | | | | | Fluff PE Type A | | | |
| Impregnated support used (g.) | 14 | 13 | 12 | 13.5 | | 13 | 31.5 | 28.5 | 29.5 | 34 | 30 |
| Nature of reactant impregnating the supp. | | | AlEt₃ | | | | | | AlEt₃ | | |
| Impregnating reactant contents of support (ml./g. of supp.) | 0.08 | | 0.1 | 0.08 | | 0.1 | | | 0.05 | | |
| Reduction reaction: | | | | | | | | | | | |
| Pure TiCl₄ used (ml.) | | | 100 | | | | | 200 | | | |
| Initial reaction temperature (° C.) | | 10 | +20 | +28 | | +60 | −30 | −10 | +5 | +25 | +40 |
| Introduction time of impregnated support in TiCl₄ (min.) | 20 | 18 | 14 | | 34 | | | 10 | | | 12 |
| Reaction time after introduction (min.) | 92 | 120 | 98 | 32 | | 82 | 75 | | 120 | 180 | 180 |
| Reaction temperature after introduction (° C.) | | | | | 23 | | | | | | 40 |
| Washing | No | Yes | | No | Yes | | | No | | | Yes |
| Nature of washing solvent | | Hexane | | | Hexane | | | | | | Hexane |
| Drying | No | Yes | No | | Yes | | | No | | | Yes |
| Transformation of brown TiCl₃: | | | | | | | | | | | |
| Reaction medium | | Liquid TiCl₄ | | | | | | Liquid TiCl₄ | | | |
| Hexane diluent contents of reaction medium (vol. percent) | | | | | | 0 | | | | | |
| Time (min.) | 90 | 30 | 15 | 120 | 150 | | | 120 | | 4,300 | |
| Temperature (° C.) | 40 | 60 | 80 | 40 | 40 | | | 40 | | 23 | |
| Washing for 1 h. with boiling hexane | Yes | | | No | | | | | | | |
| Characteristics of catalyst: | | | | | | | | | | | |
| TiCl₃ contents (g./kg. supported catalyst) | 159 | 107 | 88 | 131 | 114 | 211 | 74 | 85 | 86 | 83 | 48 |
| Reduction rate of Ti$^{IV}$ (mole percent) | 101 | 95 | | 104 | | 108 | 100 | 91 | 96 | 82 | 84 |
| Colour | | | | | | Violet | | | | | |
| Polymerization: | | | | | | | | | | | |
| TiCl₃ used (mg.) | 170 | 164 | 129 | 167 | 165 | 172 | 167 | 163 | 173 | 171 | 167 |
| Molar ratio AlEt₂Cl/TiCl₃ | 4.5 | 4.7 | 6 | 4.7 | 4.7 | 4.5 | 4.6 | 4.8 | 4.5 | 4.5 | 4.6 |
| Partial pressure H₂ (kg. a./cm.²) | | | | 0.7 | | | | | 0.8 | | |
| Temperature | | | | 60 | | | | | 55 | | |
| Weight of product prepared (g.) | 291 | 470 | 349 | 379 | 242 | 250 | 494 | 476 | 395 | 361 | 132 |
| Activity (g. PP/hx g. TiCl₃) | 570 | 958 | 904 | 756 | 490 | 486 | 987 | 976 | 760 | 705 | 264 |
| Productivity (g. PP/g. supported cat.) | 272 | 307 | 238 | 297 | 167 | 308 | 218 | 248 | 197 | 175 | 38 |
| Characteristics of PP: | | | | | | | | | | | |
| Apparent rigidity modulus under torsion at 60° arch at 100° C. (kg./cm.²) | 683 | 624 | 610 | 692 | 496 | 717 | 682 | 718 | 678 | 675 | 536 |
| MFI at 230° C. under 2.16 kg. (g./10 min.) | 3.3 | 3.2 | 3.7 | 2.7 | 1.9 | 6.9 | 5.3 | 8 | 6.3 | 11 | 10 |

| Example number | 57 | 58 | 59 | 60 | 61 | 62 | 63 | 64 | 65 | 66 |
|---|---|---|---|---|---|---|---|---|---|---|
| Impregnation of support: | | | | | | | | | | |
| Nature of support | Fluff PE Type B | | | Fluff PE Type C | | | Fluff PE Type A | | Fluff PE Type C | |
| Impregnated support used (g.) | 21 | 20 | 24 | 16 | | 24 | 34 | | 16 | |
| Nature of reactant impregnating the supp. | | AlEt₃ | | | AlEt₃ | | AlEt₃ | | AlEt₂Cl | |
| Impregnating reactant contents of support (ml./g. of supp.) | 0.1 | 0.15 | | 0.15 | | | 0.05 | | 0.15 | |
| Reduction reaction: | | | | | | | | | | |
| Pure TiCl₄ used (ml.) | | | | | | 200 | | | | |
| Initial reaction temperature (° C.) | | −10 | | | −10 | | +5 | | −10 | |
| Introduction time of impregnated support in TiCl₄ (min.) | 14 | 12 | 26 | 12 | | 24 | 10 | | 10 | 12 |
| Reaction time after introduction (min.) | 75 | 52 | 60 | | 60 | | 180 | | 60 | |
| Reaction temperature after introduction (° C) | | | | | | 23 | | | | |
| Washing | No | Yes | No | | Yes | | Yes | | No | |
| Nature of washing solvent | | TiCl₄ | | | Hexane | | Hexane | | | |
| Drying | | No | | | No | | Yes | | No | |
| Transformation of brown TiCl₃: | | | | | | | | | | |
| Reaction medium | | Liquid TiCl₄ | | | | | Diluted TiCl₄ | Gas. TiCl₄ | Liquid TiCl₄ | |
| Hexane diluent contents of reaction medium (vol. percent) | | | 0 | | | | 50 | | 0 | |
| Time (min.) | | 120 | | 120 | | 360 | 330 | 5.400 | 180 | 180 |
| Temperature (° C.) | | 40 | | 40 | | 65 | 65 | 23 | 40 | 65 |
| Washing for 1 h. with boiling hexane | | | | | | Yes | | | | |
| Characteristics of catalyst: | | | | | | | | | | |
| TiCl₃ contents (g./kg. supported catalyst) | 160 | 230 | 142 | 282 | | 171 | 61 | 62.5 | 250 | 237 |
| Reduction rate of Ti$^{IV}$ (mole percent) | | | | | | | | | | |
| Colour | | | | | | Violet | | | | |

TABLE V—Continued

| Example Number | 57 | 58 | 59 | 60 | 61 | 62 | 63 | 64 | 65 | 66 |
|---|---|---|---|---|---|---|---|---|---|---|
| Polymerization: | | | | | | | | | | |
| TiCl₃ used (mg.) | 180 | 175 | 222 | 174 | 195 | 178 | 179 | 163 | 209 | 224 |
| Molar ratio AlEt₂Cl/TiCl₃ | 4.3 | 4.4 | 3.5 | 4.5 | 4 | 5 | 4.3 | 4.7 | 3.7 | 3.5 |
| Partial pressure H₂ (kg. a./cm.²) | | 0.8 | | | 0.7 | | 0.8 | | | 0.7 |
| Temperature | 55 | 55 | | 50 | | 55 | 55 | 55 | 55 | 55 |
| Weight of product prepared (g.) | 557 | 573 | 713 | 258 | 338 | 202 | 219 | 210 | 114 | 90 |
| Activity (g. PP/hx g. TiCl₃) | 1,030 | 1,063 | ¹1,280 | ¹594 | ¹694 | 380 | 407 | 428 | ²136 | ²100 |
| Productivity (g. PP/g. supported cat.) | 495 | 754 | 450 | 418 | 488 | 195 | 74 | 80 | 136 | 131 |
| Characteristics of PP: | | | | | | | | | | |
| Apparent rigidity modulus under torsion at 60° arch at 100° C. (kg./cm.²) | 738 | 764 | 703 | 764 | 735 | 672 | 500 | 525 | | |
| MFI at 230° C. under 2.16 kg. (g./10 min.) | 2.7 | 4.5 | 1.2 | 3.4 | 3.2 | 1.9 | 5.6 | 1.6 | 5.8 | 14 |

¹ 2.5 hour's running.  ² 4 hour's running.

Finally, the application of the catalysts according to the invention to the polymerization of 4-methylpentene-1 has been studied.

EXAMPLE 67

In a 5-liter autoclave are successively introduced:
1 liter of dry hexane,
3 ml. of a 200 mg./ml. hexane solution of AlEt₂Cl,
1.2 g. of TiCl₃ supported on alumina containing 232 mg. of TiCl₃/g. of catalyst of Example 16.
200 ml. of 4-methylpentene-1.

After having closed the autoclave, a partial pressure of hydrogen of 0.7 kg./cm.² is realized and the autoclave is brought to 60° C.

The pressure is then 2 kg./cm.².

After a polymerization of 3 hour, 41 g. of crystalline poly(4-methylpentene-1) are recovered.

What we claim as new and desire to secure by Letters Patent is:

1. A process for the preparation of a catalyst for the polymerization of olefins having a high stereospecificity and containing violet TiCl₃ which comprises transforming a catalyst component which contains brown TiCl₃ to a stereospecific violet catalyst component by suspending said catalyst component which contains brown TiCl₃ in undiluted liquid TiCl₄ at a temperature below 100° C., said brown TiCl₃ being prepared by reduction of TiCl₄ with an organoaluminum compound.

2. A process according to claim 1 wherein a suspension of said catalyst component containing brown TiCl₃ in said TiCl₄ is heated for about 5 to 45 minutes at a temperature of about 40 to 80° C.

3. A process according to claim 1 wherein a suspension of said catalyst component containing brown TiCl₃ in said TiCl₄ is heated for about 15 to 30 minutes at a temperature of about 60° C.

4. A process according to claim 1 wherein a suspension of said catalyst component containing brown TiCl₃ in said TiCl₄ is maintained for about 24 hours at room temperature.

5. A process according to claim 1 wherein the catalyst containing brown TiCl₃ is prepared by reduction with said organoaluminum compound in an excess of TiCl₄, and the transformation of the brown TiCl₃ is then carried out by maintaining the brown TiCl₃ in contact with the excess TiCl₄ in the reduction reaction.

6. A process according to claim 1 wherein said catalyst component which contains brown TiCl₃ is prepared by reacting said organoaluminum compound which impregnates a support with an excess of TiCl₄ in undiluted form.

7. A process according to claim 1 wherein said catalyst component containing brown TiCl₃ is obtained by reaction with said organoaluminum compound in an excess of TiCl₄ and said catalyst component is then separated, washed and transformed into violet TiCl₃ by contact with fresh TiCl₄.

8. A process according to claim 1 wherein said catalyst component is prepared by reduction of TiCl₄ with said organoaluminum compound at a temperature below 0° C., in the presence of a solid support, the quantities of solid support, of TiCl₄ and of organoaluminum compound being chosen so that the reaction mixture remains pulverulent during the entire reaction time.

9. A process according to claim 1 wherein the TiCl₃ is supported by an α-alumina.

10. A process according to claim 1 wherein the TiCl₃ is supported by an inorganic support comprised of spheres which are constituted by agglomerated particles.

11. A process according to claim 10 wherein the spheres have an average diameter of 50 to 250μ and are constituted by elementary particles having an average diameter of 0.2 to 2μ.

12. A process according to claim 1 wherein the TiCl₃ is supported by an organic polymer which is inert toward the reactants used during the formation of brown TiCl₃, and during the transformation thereof to violet TiCl₃.

13. A process according to claim 12 wherein the support is polyethylene.

14. A process according to claim 12 wherein the support is polypropylene.

15. A process according to claim 1 wherein said brown TiCl₃ is prepared by reduction of TiCl₄ at a temperature below 100° C.

16. A process according to claim 1 wherein said catalyst component containing said brown TiCl₃ is contacted with said TiCl₄ at a temperature which is at least ambient temperature.

References Cited

UNITED STATES PATENTS

| | | | |
|---|---|---|---|
| 3,594,330 | 7/1971 | Delbouille et al. | 260—94.9 DA |
| 3,010,787 | 11/1961 | Tornqvist | 260—94.9 E |
| 3,108,973 | 10/1963 | Vandenberg | 260—94.9 E |
| 3,547,829 | 12/1970 | Lamborn | 260—94.9 E |
| 3,424,774 | 1/1969 | Tornqvist | 260—94.9 E |
| 3,153,634 | 10/1964 | Thomas | 260—94.9 DA |
| 3,141,872 | 7/1964 | Nolta et al. | 260—94.9 B |

FOREIGN PATENTS 1,950,755   6/1970   Germany.

OTHER REFERENCES

Raff et al.: Crystalline Olefin Polymers, vol. XX, Pt. 1, John Wiley & Sons, Inc., New York, pp. 75–77 (1965).

JOSEPH L. SCHOFER, Primary Examiner

E. J. SMITH, Assistant Examiner

U.S. Cl. X.R.

252—429 B, 429 C, 441; 260—93.5 S, 93.7, 94.9 B, 94.9 DA, 94.9 E; 423—85, 492